United States Patent [19]

Hickok

[11] 4,055,849
[45] Oct. 25, 1977

[54] MAGNETIC HEAD POSITIONING AND PLAYBACK APPARATUS UTILIZING A SPLIT HEAD FOR SELF-TRACKING AND SELECTIVE REPRODUCTION

[75] Inventor: William Kelsey Hickok, Rochester, N.Y.

[73] Assignee: Eastman Kodak Company, Rochester, N.Y.

[21] Appl. No.: 677,100

[22] Filed: Apr. 15, 1976

[51] Int. Cl.$^2$ .............................................. G11B 5/26
[52] U.S. Cl. ............................ 360/77; 179/100.3 V; 360/121
[58] Field of Search ........................ 360/77, 121, 122; 179/100.3 V

[56] References Cited

U.S. PATENT DOCUMENTS

| | | | |
|---|---|---|---|
| 3,246,307 | 4/1966 | Stanley | 360/77 |
| 3,541,270 | 11/1970 | Walther | 360/77 |
| 3,829,622 | 8/1974 | Elliot | 179/100.3 V |
| 3,918,091 | 11/1975 | Walraven | 360/77 |

*Primary Examiner*—John H. Wolff
*Attorney, Agent, or Firm*—Robert F. Cody

[57] ABSTRACT

Magnetic head positioning and playback apparatus is provided for use with a helical scan tape recorder to accurately position a playback head with respect to a magnetic track. The playback head has a split face portion dividing the playback gap substantially in half. Reproduce signals from the corresponding portions are simultaneously processed to provide an indication of positional error and summed to provide a playback signal. In one form, by differencing the reproduce signals from the corresponding portions and by multiplying the difference and sum signals together, a usable correction signal is provided to a servo circuit for simultaneously centering the head on the track while reproducing a playback signal — this being accomplished without the use of a separate control track. By further comparing the correction signal with a reference level, momentary disturbances in the track are detected as they occur; this information is used to determine which portion of the head provided the disturbance and to prevent that portion's signal from summing into the playback signal.

2 Claims, 5 Drawing Figures

MAGNETIC HEAD POSITIONING AND PLAYBACK APPARATUS UTILIZING A SPLIT HEAD FOR SELF-TRACKING AND SELECTIVE REPRODUCTION

BACKGROUND OF THE INVENTION

1. Field of the Invention

This invention relates in general to apparatus for positioning a magnetic transducer with respect to a magnetic track; more particularly, the invention is concerned with a magnetic head positioning and playback apparatus which uses the playback signal to maintain track position.

2. Description Relative to the Prior Art

While not so restricted, the invention acquires a special significance when it is used to accurately position a rotating playback head with respect to a magnetic tape track which was recorded with a transverse or helical scan magnetic tape recorder. In order to realize a high track density, present transverse and helical recording techniques provide a pattern of magnetic tracks with narrow guard bands separating the tracks. The advantages of such a high track density depend, of course, on the ability of the playback head to accurately correlate with each recorded track during reproduction. To maintain the highest correlation, the center of the useful gap of the playback head must invariably follow the center of each recorded track. If the playback head fails to center on each recorded track, interference voltages are established when the playback head slides into the adjacent guard band. In addition, the information output of the head will suffer as it no longer tracks the full recorded track width. Indeed, the information content of the reproduced signal may be lost if the playback head crosses over between recorded tracks.

Endeavoring to meet these difficulties, and in particular for use with helical or transverse recording with rotating heads, one commonly used tracking system disposes a control track adjacent a longitudinal edge of the tape. During playback a control track head, coupled to control circuits in the reproduction electronics, reproduces a timing signal from the control track. This timing signal was earlier recorded simultaneously with the information signal and, as such, reflects the electrical and mechanical transients present during recording. The control circuits compare the timing signal to a feedback pulse from the head drum and generate a tracking signal which so variably drives the rotating heads that they accurately follow the recorded tracks. Another tracking system provides reference tracks on either side of each main track. These reference tracks are scanned by checking heads positioned on either side of a main head; a comparison between the voltages induced in each of the checking heads provides an indication of head to track orientation. Unfortunately, but necessarily, both of the tracking methods thus far described must sacrifice usable portions of the recording surface for placement of reference tracks.

Therefore it is clearly more advantageous, spacewise, to correlate the position of the reporduce head to the magnetic track by using the information signal written in the track itself rather than by using additional reference signal tracks. To this end, magnetic heads have been provided with two auxiliary checking heads having useful checking gaps located on either side in front of and behind the main gap. These gaps are positioned symmetrically with regard to the center of the main gap and each cover an edge of the track. If the main gap is correctly positioned with respect to the track and the magnetization in the track is constant, the voltages induced in each of the side checking heads will be equal to one another, thereby indicating proper orientation. However, this adjusting mechanism requires two auxiliary heads in addition to the main head. For use with a magnetic disc file, Stanley (U.S. Pat. No. 3,246,307) reduces the foregoing apparatus to two separate magnetic elements which are spaced from each other. These elements are effectively separate heads which each correlate with less than half of the magnetic track for producing a servo control signal and, after servo positioning is completed, for producing a playback signal.

In a further development directed toward track control without separate reference tracks, Walther (U.S. Pat. No. 3,541,270) provides a magnetic head having one of its two pole pieces divided in the direction of travel of the magnetic carrier into two magnetically insulated portions. A coil is provided for each of the portions to allow separate voltages representative of head position to be generated. By relative comparison of the two voltages induced in each of the portions during the adjustment of the head of the track, any positional error may be directly detected. The amplitude of the difference signal thus detected is a measure of positional error while the phase of the difference signal will indicate the direction of deviation of the head from the track. Once correctly adjusted to the track, the polarity of one of the checking circuits may be altered and the head may be used as a conventional playback head across a full track width. While this system may be used for intermittent playback from, for example, a random access magnetic disc assembly, it is unsuited for maintaining continuous track control over, for example, helically-recorded video information being reproduced from a magnetic tape.

SUMMARY OF THE INVENTION

The prior developments in self-tracking have primarily involved random access disc memory systems — a form of magnetic recording peculiarly adaptable to the sequential steps of, first, servo positioning and, then, playback. Although such an intermittent scheme does not lend itself to the continuous processing of information from a magnetic medium, the invention has nonetheless merged the beneficial aspects of self-tracking with the inherent requirements of continuous processing by providing a magnetic head positioning and playback circuit for simultaneously forming a tracking signal and a playback signal from a single split playback head. The head includes a playback gap defined between two pole pieces for cooperation with and reproduction from a magnetic track on a magnetic tape. At least one of the pole pieces is divided in the longitudinal direction of the track into two tracking portions separated by a non-magnetic gap. Each of the tracking portions is connected to the non-divided pole piece. Means are provided on each of the portions to generate a voltage representative of head position.

In a key aspect of the invention, the dual output signal of the playback head is coupled simultaneously to a summing circuit and a tracking signal generator. What results are simultaneously useful playback and tracking signals, respectively. The tracking signal generator may take several forms; each form, however, must deliver an output suitable for a servo control mechanism — namely, an output having a parameter which varies proportionately to both the amplitude and direction of tracking error. While in the prior art the playback signal can be directly useful in the playback circuits, the tracking signal is a different matter. It represents a composite of phase and amplitude information: phase indicating the direction of tracking error and amplitude indicating the magnitude of tracking error. Thus, a difference circuit and a complementary phase detector may be employed to provide the tracking signal for controlling a head servo mechanism. One form of the tracking signal generator operates by multiplying the summed output of the head with its differenced output, a tracking voltage signal being generated having a polarized direct current component. In another form of the tracking signal generator, a pair of envelope detectors, which process the dual output of the playback head, are connected to a differential circuit to provide a tracking signal. The signal from either form is suitable for simultaneously controlling a servo control mechanism.

In a further aspect of the invention, and taking particular advantage of the simultaneity of tracking and reproduction, the reproducing circuit provides for selectively coupling the output of either or both tracking portions of the playback head to the reproduction circuits. While the output signals from each tracking portion are usually summed and coupled to the reproduction circuits, there are tracking situations where one tracking portion is capable of producing a substantially better signal than the summed output of both tracking portions. This may occur, for example, when one tracking portion experiences a momentary burst of noise output as it passes over a dropout, a tape kink or splice, or when the recorded signal includes a synchronization failure. Since the noise may be simultaneously detected both as to amplitude and direction in the track, the reproducing circuit disables the noise-producing track portion and derives all its output from the other track portion. When the distrubance passes, the disabled track portion is turned on again.

BRIEF DESCRIPTION OF THE DRAWINGS

The invention will be described with reference to the figures, wherein.

DESCRIPTION OF THE PREFERRED EMBODIMENTS

Because magnetic heads and playback circuits are well known, the present description will be directed in particular to elements forming part of, or cooperating more directly with, the present invention. Elements not specifically shown or described may take various forms well known to those skilled in the art.

Figure 1:
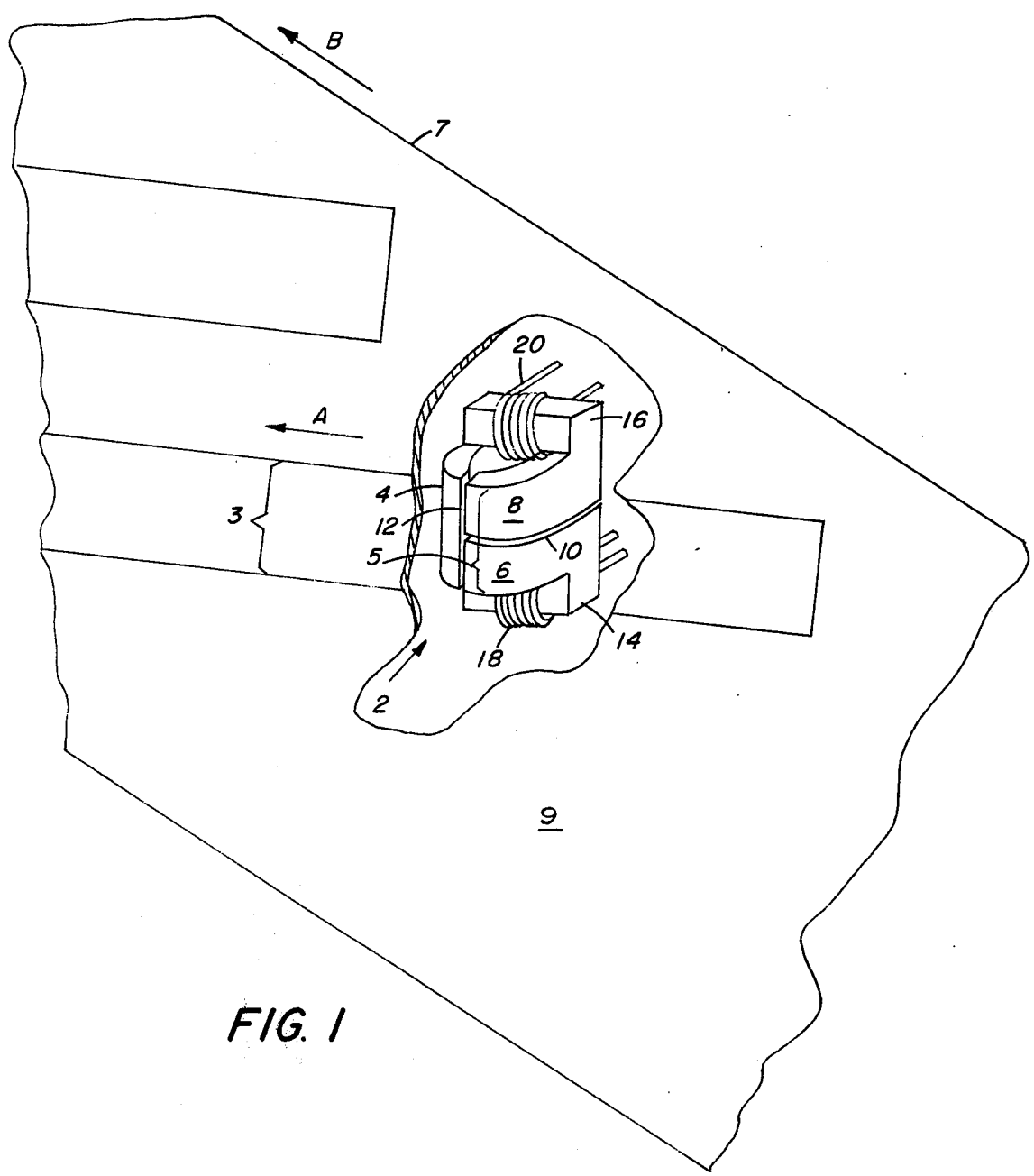
FIG. 1 is a perspective view illustrating an embodiment of a split gap playback head of the invention, showing in particular the two tracking portions.

Referring now to FIG. 1, a magnetic transducing head 2, composed of a suitable magnetic transducing material such as a ferrite, includes a useful playback gap 12, formed by any of the known methods, which is defined between an undivided pole piece 4 and a pole piece 5 which is further divided into two tracking portions 6 and 8. A tracking gap 10 separates the tracking portions 6 and 8 along an axis paralleling the direction of travel — shown by the arrow A — of the head 2 relative to a magnetic track 3 helically recorded on a record carrier 5, which is illustrated as a magnetic tape having a longitudinal edge 7 and travelling in the direction as shown by the arrow B. A material fills the tracking gap 10 and assures that the flux paths originating from the two halves of the split playback gap 12 do not substantially cross the tracking gap 10. The magnetic circuit of the head is completed by means of two yokes 14 and 16, each having coils 18 and 20 associated therewith. When the head 2 is passed in proximity to a magnetic track on a magnetic tape — the track being approximately the width of the pole pieces 4 and 5 — current is induced in each of the coils 18 and 20 representative of that half of the track while the tracking portions 6 and 8 are cooperating with.

When the tracking gap 10 coincides with the center of the magnetic track, the voltages induced in each of the coils 18 and 20 are approximately equal in amplitude and — since the signal recorded is the same across the track — in phase. (The equality of voltage amplitude presumes that the tracking gap 10 divides the playback gap 12 substantially in half.) If the tracking gap 10 deviates from the center of track, the amplitude of the voltages in each of the coils 18 and 20 will no longer correspond. That tracking portion which no longer fully passes over the recorded track will induce a voltage in its coil which is less in amplitude than the voltage induced in the other coil. The value of this difference indicates how far the head 2 has slipped off the recorded track while that tracking portion which yields the diminished output will indicate the direction of slippage. Should the tracking gap 12 be designed to divide the playback gap 12 by some other proportion than one-half, the amplitude of the voltages in each of the coils 18 and 20 will not be equal when the playback gap 12 is perfectly centered over the track. There is no problem as long as these desired corresponding voltages are known; a transform or other suitable treatment or conversion of such a known correspondence should be considered implicit in the following discussion such that any reference to a perfect center tracking signal includes the notion of non-equal voltages in coils 18 and 20.

Figure 2:
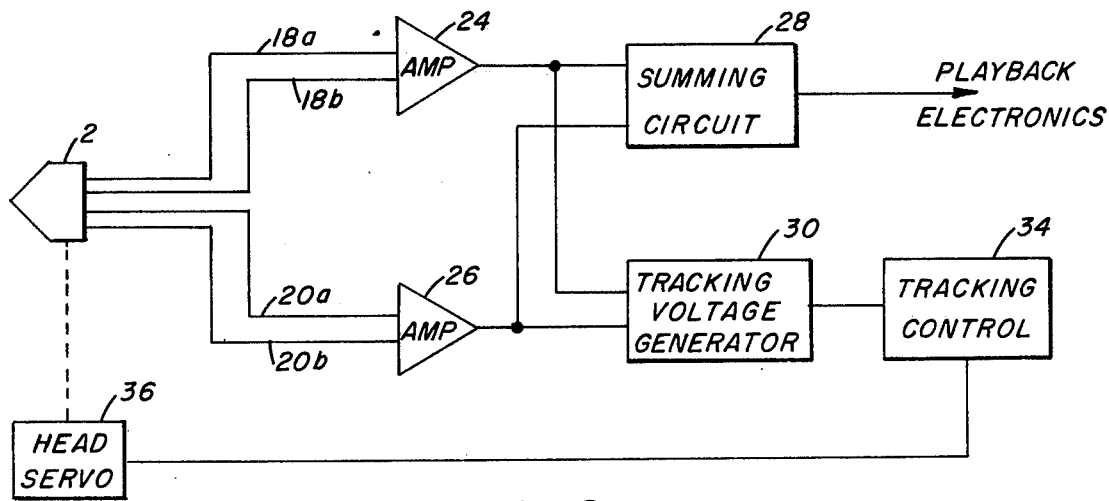
FIG. 2 is a block diagram useful in describing the basic nature of the invention.

The voltages developed in coils 18 and 20 are processed by the circuit illustrated in FIG. 2. Leads 18A and 18B, and 20A and 20B couple the induced voltages in coils 18 and 20 to a pair of amplifiers 24 and 26, respectively. While the circuit may operate satisfactorily without amplifiers 24 and 26, some amplification of the weak playback signals is desirable at this point. The amplifiers may be selected from those generally known in the art as long as both amplifiers have substantially the same gain and phase shift characteristics. The amplifiers 24 and 26 therefore provide an output signal substantially identical in amplitude, except for tracking irregularities, and phase. By means of a crossover connection, the outputs of both amplifiers 24 and 26 are provided to a summing circuit 28 and a tracking signal generator which, for purposes of this description, is shown as a tracking voltage generator 30.

The circuit 28 may be selected from any of the well known linear adding circuits; the circuit 30 may take the forms illustrated in FIGS. 3 and 4, which will be described shortly. It is important to note that the output of the tracking voltage generator 30 must be a signal sufficient to drive a tracking control circuit 34. What this requires is an output signal having a parameter which maintains a value proportionate to both the amplitude and direction of tracking error. This signal typically could be a direct current component having a quiescent value indicating no tracking error and a voltage swing therearound indicating the direction and magnitude of tracking error. When the tracking control 34 receives such a variation, a head servo mechanism 36 responds to the tracking control circuit 34 and variably drives a rotating head wheel on which the head 2 is mounted. The magnetic reproducing circuit, in its preferred form, is adapted to simultaneously reproduce a signal helically recorded on a magnetic tape and cause the rotating heads to precisely follow the helical tracks on the tape — all without the use of a separate control track or a separate tracking head.

Figure 3:
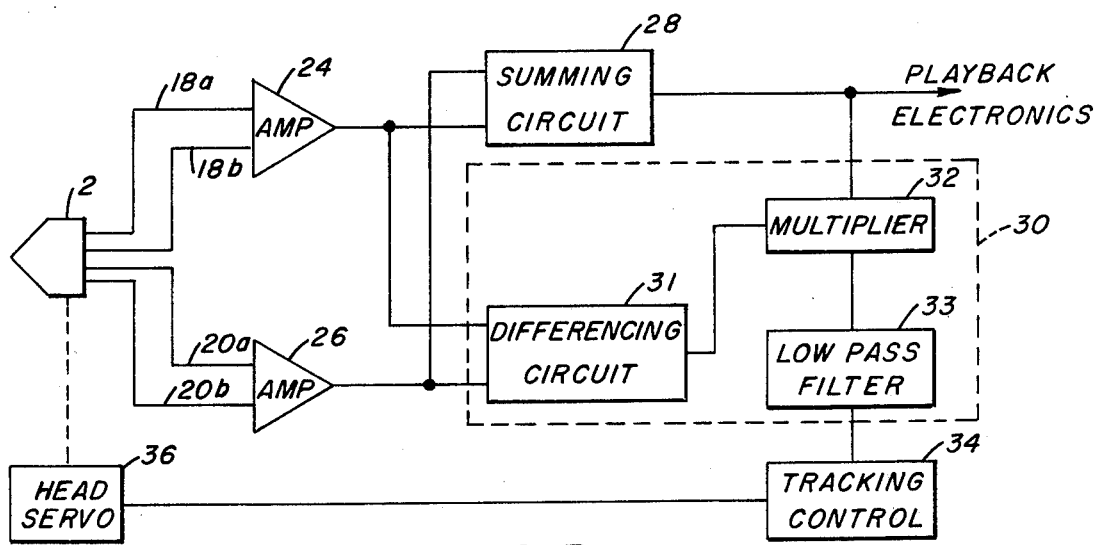
FIG. 3 is a block diagram illustrating a circuit for simultaneously providing a tracking and playback signal.

One of the forms which the tracking voltage generator 30 may take is illustrated in FIG. 3 by a differencing circuit 31, a multiplier 32, and a low pass filter 33. The summing circuit 28, in FIG. 3, is adapted to add the output signals from amplifiers 24 and 26, which correspond to the playback signals induced in each of the coils 18 and 20 as the useful gap 12 scans the magnetic tape. At the same time, the signals from the amplifiers 24 and 26 are processed by the differencing circuit 31, which provides an output proportional to the difference between the amplitude of the two signals. The circuit 31 may comprise a linear differencing circuit or a linear adding circuit with an inverting circuit in one input leg. At this point, it must be remembered that the signals reproduced from the tape and the amplified output of amplifiers 24 and 26 are complex waveforms having sinusoidal components. While these two waveforms may be added in the summing circuit 28 to provide an immediately usable signal for the recorded playback circuits, such is not the case with the differencing cirucit 31. The amplitude of the difference signal is a measure of the magnitude of the tracking error while the phase of the difference signal is a measure of the direction of the tracking error. As such, the difference signal is not suitable for controlling the tracking servo mechanisms, since both the tracking error direction and magnitude are not indicated by the same varying parameter.

However, by providing a multiplier circuit 32, a product signal is obtained having a DC component proportional to the direction and magnitude of tracking error. The circuit 32 obtains this result by multiplying the difference signal from the differencing circuit 31 by the sum signal from the summing circuit 28. The type of signal obtained is one which centers on zero for no difference and goes positive or negative, depending on the direction and magnitude of the difference. Such a multiplier circuit may be selected from those known in the art and may comprise, for example, a phase detector circuit. The significance of its use lies in the realization that a signal indicative of tracking error may now be developed and used simultaneously with the playback signal. In a preferred application of this system, the DC component of the product signal obtained from the multiplier circuit 32 is isolated by a low pass filter 33 and connected to a tracking control circuit 34 for use in the manner heretofore described.

Figure 4:
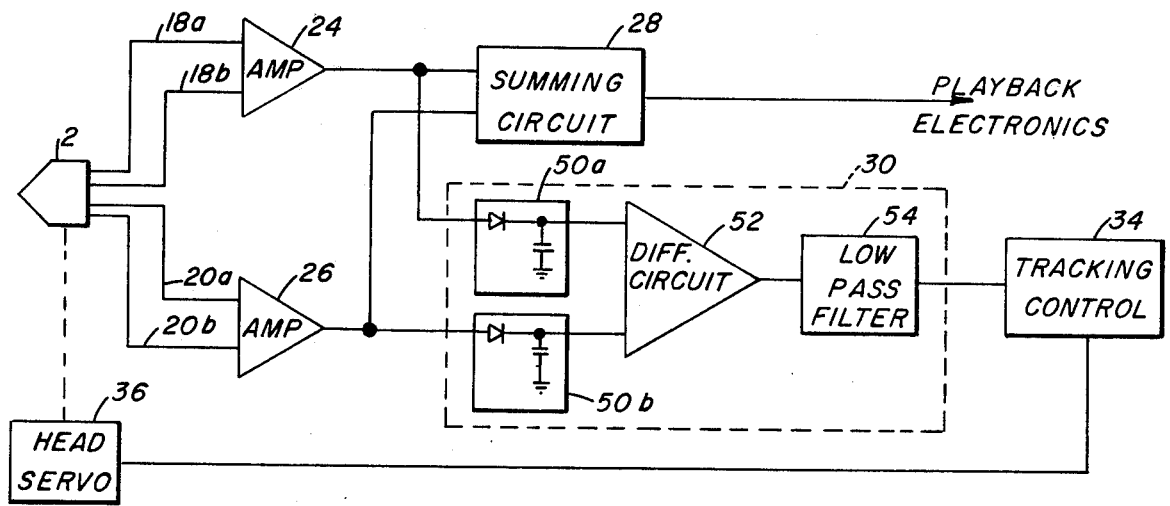
FIG. 4 is a block diagram illustrating another circuit for providing a tracking signal, showing in particular the use of an envelope detector.

Another embodiment of the tracking voltage generator 30 is illustrated in FIG. 4. A pair of envelope detectors 50A and 50B indicate the relative magnitude or power of the two outputs from the amplifiers 24 and 26. The output voltages of the envelope detectors 50A and 50B are then subtracted in a differential circuit 52. Spurious high frequencies are eliminated by a low pass filter 54 and a tracking output is provided to the tracking control and head servo circuits 34 and 36 as described heretofore.

Figure 5:
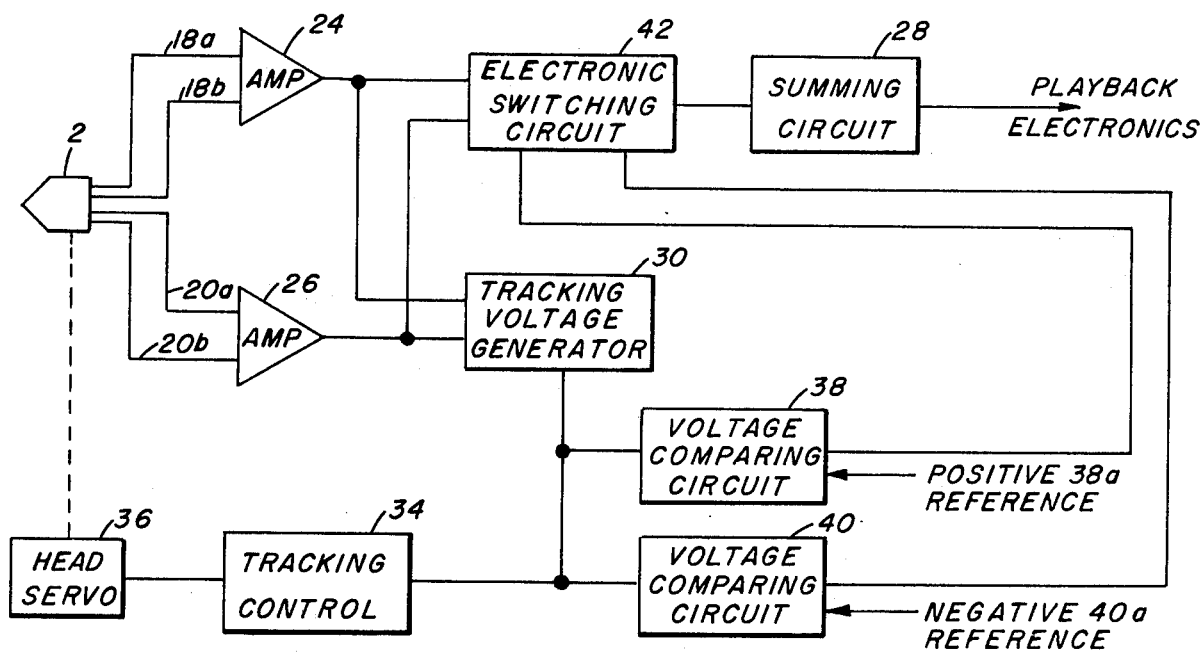
FIG. 5 is a block diagram illustrating the circuit of FIG. 2 as modified to selectively provide a playback signal which includes the output of either or both tracking portions of the head illustrated in FIG. 1.

The availability of simultaneous tracking and playback information, in particular from a split gap head, leads to the improvement illustrated in FIG. 5. The block diagram shows a diversity form of reproduction using dual playback modes, corresponding to the dual tracking portions of the playback head, to compensate for excessive noise or outages in either of the modes. Occasionally kinks or splices in the tape, or dropouts in the signal, will disable part, but not all, of the width of the recorded track. A portion of the track may also be unusable in situations where synchronization is interrupted in switching from one video source to another. At such times, there is a momentary, but large, magnitude change in the output of the tracking voltage generator 30. This change can be detected and used to block the output from the offending tracking portion of the head until the disturbance passes. For these purposes, a pair of voltage comparing circuits 38 and 40 are provided for connection between the tracking voltage generator 30 and the tracking control circuit 34.

In operation, the voltage comparing circuit 38 continuously compares the tracking signal to a positive reference 38A. If the portion of the useful gap 12 bounded by the tracking portion 6 scans a momentary disturbance in the tape, the sudden change in the current induced in coil 18 causes the tracking signal from the tracking voltage generator 30 to exceed the positive reference. Thereupon an inhibit signal is coupled from the voltage comparing circuit 38 to an electronic switching circuit 42 which blocks the output of the amplifier 24 from adding into the playback signal. What results, therefore, is that the recorder playback electronics receive a somewhat diminished but substantially more faithful playback signal from the head 2 than if both tracking portions 6 and 8 were operative. Similarly, if the portion of the useful gap 12 bounded by the tracking portion 8 scans a momentary disturbance in the tape, the sudden change in current induced in the coil 20 causes the tracking signal from the tracking voltage generator 30 to exceed a negative reference 40A provided to the voltage comparing circuit 40. Thereupon, an inhibit signal is coupled from the voltage comparing circuit 40 to the electronic switching circuit 42, which in turn blocks the output of amplifier 26 from adding into the playback signal. Positive reference 38A and negative reference 40A are set at such values that ordinary, but correctable, deviations from the center of the recorded track will not cause the operation of the electronic switching circuit 42. Rather, the amplifiers 24 and 26 are blocked only during unusual disturbances on one part of the track and then for only as long as the disturbance lasts. When the disturbance passes, the tracking signal will again fall between the bounds defined by the positive and negative references 38A and 40A and the output of both amplifiers 24 and 26 will be summed for the playback circuits.

The invention has been described in detail with particular reference to preferred embodiments thereof, but it will be understood that variations and modifications can be effected within the spirit and scope of the invention. For example, the embodiment as disclosed will function similarly if the tracking gap 10 on the playback head 2 divides both pole pieces 4 and 5 into four separate tracking portions. Although the invention has been described with particular reference to transverse and helical scan magnetic tape reproduction, it is clear that the invention may be used with any form of magnetic reproduction, such as longitudinal reproduction or reproduction from circular tracks in a magnetic disc assembly.

What is claimed is:

1. A magnetic head positioning and playback apparatus for use with a magnetic head having a playback gap for reproducing a signal from a magnetic track on a track bearing record carrier, the head comprising a first pole piece and a second pole piece, the pole pieces having end surfaces each defining and being separated by the playback gap, non-magnetic means dividing the first pole piece including its end surface into first and second portions such that the playback gap is correspondingly divided, magnetic means respectively coupling each of said first and second portions to the second of said pole pieces to form first and second magnetic circuits, the improvement wherein the positioning and playback apparatus further comprises:

electrical means coupled to each of said magnetic circuits simultaneously operative in a first mode for providing from the first and second magnetic circuits a tracking error signal having a component indicative of the magnitude and direction of the error in the position of the head relative to the magnetic track and in a second mode for providing a playback signal from the first and second magnetic circuits;

comparator means for monitoring said tracking error signal and for providing a switching signal when the value of said tracking error signal exceeds a predetermined level indicative of a disturbance in the magnetic track which is being predominantly reproduced by the first of the magnetic circuits; and switching means responsive to said switching signal for cooperating with said electrical means operative in said second mode for providing an alternate playback signal from the second magnetic circuit, whereby said alternate playback signal is provided from that magnetic circuit which is not predominantly affected by the disturbance in the magnetic track.

2. Magnetic reproducing apparatus for use with a magnetic tape recorder of the type wherein a magnetic tape having magnetic tracks thereon is associated with a rotating head wheel having at least one head mounted for rotation therewith, the combination comprising:

a magnetic reproduce head comprising first and second track-cooperating face parts separated by a playback gap, at least one of said face parts being divided into first and second track-cooperating portions, induction means for providing a first and second reproduce signal from said first and second track-cooperating portions, respectively, when said head cooperates with a magnetic track on the tape;

signal generating means for providing a correction signal from said first and second reproduce signals having a component indicative of the magnitude and the direction of the error in the position of said head relative to the magnetic track;

electrical summing means simultaneously operative with said signal gneerating means for providing a playback signal from said first and second reproduce signals;

electrical comparator means for comparing the level of said correction signal with a reference level and for providing an inhibit signal when the level of said correction signal exceeds said reference level, said correction signal level exceeding said reference level when one of said track-cooperating portions is cooperating with a disturbance in the track and providing a corresponding signal disturbance in one of said reproduce signals; and electrical switching means responsive to said inhibit signal for preventing said one of said reproduce signals from coupling with said electrical summing means, whereby said electrical summing means provides an alternate playback signal from the other of said reproduce signals.

* * * * *